June 10, 1924.
C. NOTH
1,497,632
RESILIENT MOUNTING FOR VEHICLE SEATS
Filed July 21, 1922     2 Sheets-Sheet 1
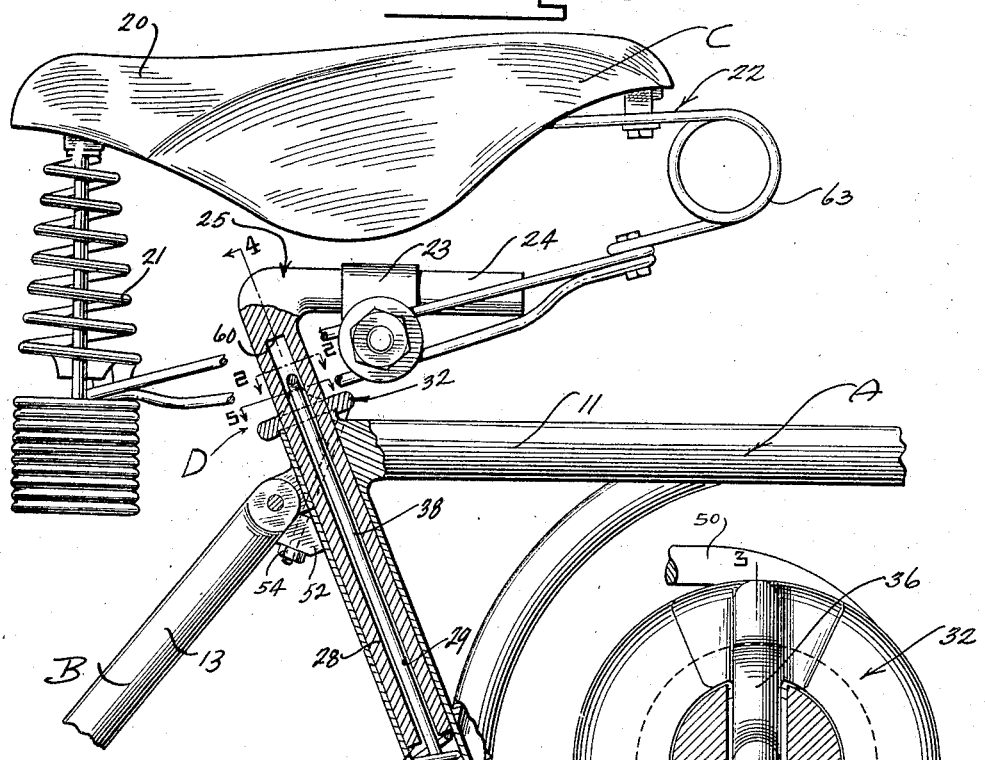
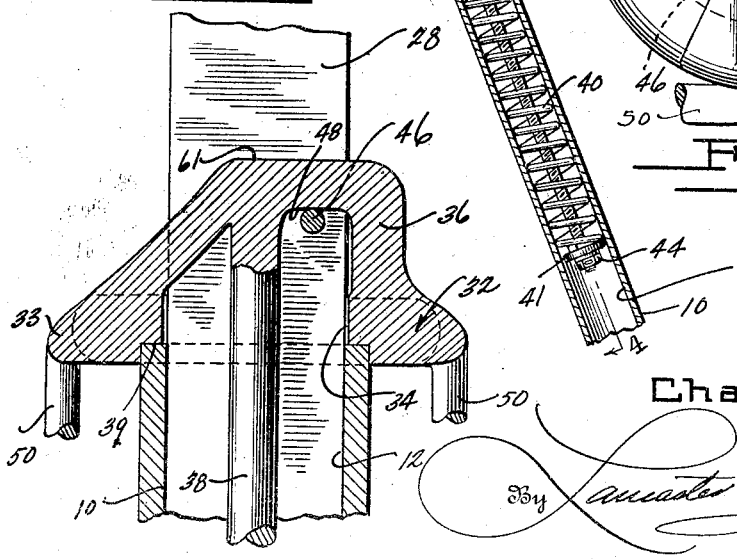
Inventor
Charles Noth
By Lancaster and Allwine
Attorneys June 10, 1924.
C. NOTH
RESILIENT MOUNTING FOR VEHICLE SEATS
Filed July 21, 1922    2 Sheets-Sheet 2
1,497,632
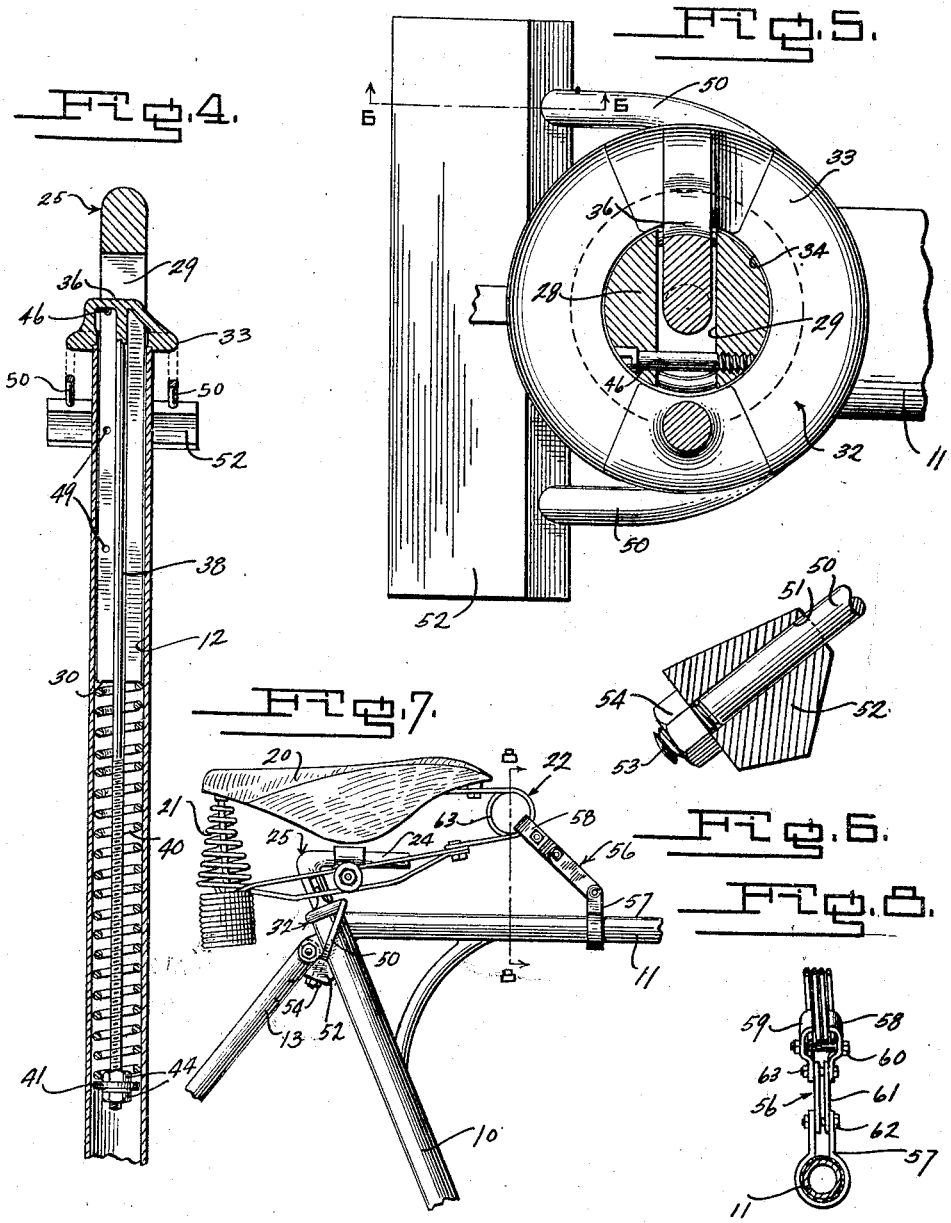
Inventor
Charles Noth Patented June 10, 1924.

1,497,632

UNITED STATES PATENT OFFICE.

CHARLES NOTH, OF NEENAH, WISCONSIN.

RESILIENT MOUNTING FOR VEHICLE SEATS.

Application filed July 21, 1922. Serial No. 576,592.

*To all whom it may concern:*

Be it known that I, CHARLES NOTH, a citizen of the United States, residing at Neenah, in the county of Winnebago and State of Wisconsin, have invented certain new and useful Improvements in Resilient Mountings for Vehicle Seats, of which the following is a specification.

This invention relates to an improved seat construction for bicycles, motorcycles and the like.

The primary object of this invention is the provision of a spring supported seat post for vehicles, such as bicycles, motorcycles and the like, which cooperates with the frame of the vehicle to which it is attached in such manner as to insure an effective working arrangement, giving comfort to the rider, and acting as a shock absorber in this respect.

A further object of this invention is the provision of a resiliently supported seat post construction for bicycles, motorcycles and the like, which is relatively simple, compact in arrangement, and which can be easily attached to the standard frame construction of conventional bicycles and motorcycles.

An important object of this invention is the provision of a device adapted for accessorial use in connection with bicycles and motorcycles, embodying improved means for spring suspension of a seat post, and which is compactly assembled for trade use, necessitating no alteration in order to provide for its attachment to standard makes of bicycles and motorcycles and which does not require any skilled labor to effect such attachment.

Other objects and advantages of this invention will be apparent during the course of the following detailed description.

In the accompanying drawings, forming a part of this specification, and wherein similar reference characters designate corresponding parts throughout the several views:

Figure 1 is a fragmentary side elevation, partly in section, showing details of the improved seat post construction as embodied in a supporting frame.

Figure 2 is a transverse sectional view, taken substantially on the line 2—2 of Figure 1.

Figure 3 is an enlarged fragmentary view, partly in section, taken on the line 3—3 of Figure 2.

Figure 4 is a longitudinal sectional view, taken substantially on the line 4—4 of Figure 1, and showing improved details of the resiliently supported seat post.

Figure 5 is a transverse sectional view, taken substantially on the line 5—5 of Figure 1.

Figure 6 is a transverse sectional view, taken substantially on the line 6—6 of Figure 5.

Figure 7 is a side elevation of the seat construction of a bicycle, showing its adjacent frame supporting arrangement.

Figure 8 is a cross sectional view, taken substantially on the line 8—8 of Figure 7.

In the drawings, wherein for the purpose of illustration is shown but the preferred embodiment of this invention, the letter A designates a vehicle, such as a bicycle or motorcycle, embodying a frame B; seat device C; and supporting construction D for seat C.

The frame B of vehicle A may be of different types of construction, such as those now found in conventional use, and embodies a tubular seat post receiving member 10, having a horizontal cross bar 11 attached thereto at the upper end in such way as to permit free access to the passageway 12 of said tubular member 10 from its upper end. A rear fork construction 13 is provided, the same being attached adjacent the upper end of the tubular member 10 upon the side thereof opposite to the cross bar construction 11.

Referring to the seat arrangement C, the same may be of the various kinds provided for the type of vehicle A, embodying a saddle member 20 supported at its rear end by the saddle springs 21, and at its front end by the forwardly extending spring 22, which is provided with a clamping member 23 adapted for attachment to a horizontal portion 24 of the novel seat post 25 embodied in this invention.

Referring to the supporting construction D, the seat post 25 thereof is of the general formation generally provided of seat posts, and includes the horizontal portion 24 above mentioned, and the depending stem portion 28, which is provided with a longitudinal slot 29 extending axially therethrough from its lower end 30 and open at opposite sides thereon; said portion 28 of the seat post 25 being adapted for plunger action in the passageway 12 of the frame tube 10 in a manner to be subsequently described. An attaching member 32 is preferably provided, which includes a head portion 33 of ring shaped formation, having the central opening 34 therein, through which the portion 28 of the seat post 25 slides. A guide yoke 36 is integrally formed over the ring shaped head 33, extending upwardly from the plane defined thereby, and which supports the relatively long rod 38, rigidly therewith. The head portion 33 is provided with an annular groove 39 in the lower surface thereof circumferentially about the passageway 34, and which is provided for receiving the upper marginal portion of the frame tube member 10, so that the yoke 36 extends upwardly and exteriorly of the tube 10, with the rod 38 depending axially through the passageway 12 of the frame tube 10.

The seat post 25 is adapted for cooperation with the attaching member 32, and the slot 29 slidably receives the yoke or cross piece 36 therein, as well as the rod 38. In order to normally maintain the seat post 25, in an upper resiliently supported position with respect to the attaching member 32, a spiral spring 40 is supported by a washer 41; said washer 41 being adjustably mounted upon the extreme lower or free end of the rod 38, as by means of the lock nuts 44. The spring 40 is normally under compression to force the post 25 upwardly with respect to the attaching ring portion 33, and in order to effect such result, the upper end of the spring engages the lower marginal portion 30 of the post 25. A pin or detachable countersunk screw 46, is detachably and transversely provided through the stem portion 28 of the seat post 25, laterally of the longitudinal center of said stem portion 28, and which extends transversely through the longitudinal slot 29, and normally engages the lower surface 48 of the yoke portion 36, so that the spring 40 may be maintained under an initial compression to resiliently support the post 25. Various apertures 49 may be provided longitudinally of the stem portion 28 of the seat post 25 as shown in Figure 4, which are adapted for receiving the detachable screw member 46, so that the initial compression of the spring 40 may be varied, according to the weight of the driver of the vehicle A, and which can readily be understood is a desirable and important arrangement.

In the attachment of the supporting construction D to the frame B, a pair of bolt stems 50 are provided, depending below the ring portion 33 of the attaching member 32 and preferably formed rigid therewith, the same extending at an acute angle to the plane defined by the ring portion 33, and being provided for insertion through passageways 51 provided in a clamping block member 52, which is adapted for placement at the juncture of the frame fork 13 and the tube 10; the extreme free ends 53 of the bolt stems 50 being threaded and adapted for receiving adjusting nuts 54 so that the stems 50 may engage upon opposite sides of the tube 10 and be clamped in the block 52 for secure attachment of the ring member 33 to the top of the tube 10. Thus, the device D is attached to the vehicle frame B with the spring extending into the passageway 12 of the frame tube 10, and the stem portion 28 of the seat post 25 cooperating in plunger like manner within said passageway 12, the spring 40 normally resiliently supporting the same.

In order to prevent any lateral sway of the seat arrangement C, a link connection 56 is preferably provided, including a clamp member 57 for attachment to the cross bar 11 of the frame B; a pair of clamp members 58 and 59 adjustably held in position by means of the bolt 60 to detachably engage the forward convolutions 63 of the spring seat 22; and a connecting link 61 pivotally connected at one end by means of a bolt 62 to the clamp 57, and at its other end pivotally connected by a bolt 63 to the clamp pieces 58 and 59. By this arrangement, the seat arrangement C is prevented from lateral sway, by reason of the fact that the link arrangement 56 cannot sway laterally, but is flexible in a vertical plane, so that the seat construction C may readily ride in vertical manner to insure the comfort of the driver.

From the foregoing description of this invention, it can be seen that a very compact seat post construction has been provided, which is susceptible of universal attachment to conventional vehicles, merely requiring the attachment of nuts 54 to the bolt stems 50 in order to insure the mounting of the same in proper position upon the vehicle frame B. The upper limit of movement of the seat construction C is defined by the positioning of the cross pin or screw member 46 in its engagement with the bottom surface 48 of the yoke portion 36 of the attaching portion 32. On the other hand, the lowermost movement of the seat C is controlled by engagement of the slot end surface 60 with the top surface 61 of the yoke portion 46, so that there is no liability of injury to the post construction D by reason of excessive weight or shock being imposed thereon. As the vehicle A is propelled, the stem 38 will ride in plunger like manner within the passageway 12 of the frame tube 10, so that during reciprocation in the frame 12, the seat C will be supported by the spring 40 as can readily be understood.

Various changes in the shape, size, and arrangement of parts may be made to the form of invention herein shown and described without departing from the spirit of the same or the scope of the claims.

I claim:

1. In a seat post construction, the combination of a tubular support, a rod, means mounted on the upper end of the tubular support to depend said rod therein, a spring carried in said tube by the inner end of said rod, and a seat post resiliently supported upon said spring.

2. In a seat post construction, the combination of a tubular support open at an end thereof, a rod, a cap member formed rigid with said rod for attachment over the open end of the tubular support, a seat post having a slotted stem slidably extending through said attaching cap into the interior of said tubular support, said rod extending into the tubular support, and a spring carried within said tubular support by the inner end of said rod normally engaging the inner end of said seat post stem to resiliently support the said seat post.

3. In a seat post construction, the combination of a tubular support open at an end thereof, a rod, a cap member formed rigid with said rod adapted for attachment over the open end of said tubular support, a seat post having a slotted stem slidably extending through said attaching cap into the interior of said tubular support, said rod extending into the tubular support, a spring carried within said tube by the rod normally engaging the inner end of said seat post stem to resiliently support the seat post, and means for adjusting the tension of said spring.

4. A seat post construction comprising a tubular support defining a passageway therethrough and having an end thereof open, a cap member attached over the open end of said tube and having an opening therein aligning with the passageway of said tube, a seat post including a stem having a slot therein, a spring supported within said tube, said seat post normally extending slidably through said cap opening to be resiliently supported by said spring, and means carried by said seat post stem and extending through the slot therein for engagement with said attaching cap to normally limit outward movement of said seat post with respect to said cap, and to maintain said spring under an initial compression.

5. In a device of the class described, the combination with a supporting frame open at its upper end, of an attaching member secured about the upper end portion of said frame and extending over the frame, a spring in said frame, means for supporting said spring connected with said attaching member and extending into the frame through the open upper end thereof, and having means engaging the lower end of the spring to support the spring, a seat post slidably extending into said frame through the open upper end thereof and having its lower end resting upon the upper end of said spring, said post being normally urged upwardly by said spring, and means for securing said attaching member to said frame.

6. In a device of the class described the combination with a supporting frame, of an attaching member connected with said frame, a spring in said frame, means for supporting said spring from said attaching member, a seat post slidable in the frame longitudinally of the spring and spring supporting means and normally urged in one direction by said spring, means for securing said attaching member to said frame, and means carried by said seat post for engaging said attaching means and limiting movement of said seat post to normally maintain said spring under an initial compression for resiliently supporting said seat post.

7. In a device of the class described, the combination with a supporting frame, of an attaching member connected with said frame, a spring in said frame, means for supporting said spring from said attaching member, a seat post slidable in the frame longitudinally of the spring and spring supporting means and normally urged in one direction by said spring, means for securing said attaching member to said frame, means carried by said seat post for engaging said attaching means limiting movement of said seat post to normally maintain said spring under an initial compression for resiliently supporting said seat post, said means being adjustable to vary the initial compression of said spring.

8. As an article of manufacture, a seat construction comprising an attaching member having an opening therethrough provided with an offset portion extending into said opening, a spring, means for supporting said spring from said attaching member, and a seat post slidably carried through the opening of said attaching member having a slot therein for slidably receiving the offset portion of said stem attaching member, said seat post having an end thereof engaging said spring in order to be resiliently supported thereby.

9. As an article of manufacture, a seat construction comprising an attaching member having an opening therethrough provided with an offset portion extending into said opening, a spring, means for supporting said spring from said attaching member, a seat post slidably carried through the opening of said attaching member having a slot therein for slidably receiving the offset portion of said stem attaching member, said seat post having an end thereof engaging said spring in order to be resiliently supported thereby, and a pin transversely carried by said seat post extending through the slot therein and adapted for engagement with the offset portion of the yoke of said attaching member in order to maintain said spring under an initial compression for resiliently supporting said seat post.

10. In a device of the class described, the combination with a frame including a fork portion and a tubular portion open at an end thereof, of a cap member including a ring shaped portion having a passageway therethrough, and a yoke portion extending over said ring shaped portion transversely of the passageway therethrough, means for detachably securing said ring shaped portion of the cap member over the upper end of said tubular frame portion, a rod carried by the yoke portion of said cap member and depending axially through the passageway of said tubular portion of the frame, a spring carried within said tubular member on the lower end of said rod, a seat post including a slotted stem portion slidable through the opening of said cap and having said yoke portion extending through the slot thereof, said stem engaging said spring within said tubular member to be resiliently supported, and means to prevent detachment of said seat post with respect to said frame.

11. As an article of manufacture, a seat post construction comprising an attaching cap including a ring shaped attaching portion providing a passageway therethrough having bolt stems extending therefrom and including a yoke portion extending transversely over said ring shaped portion, a rod depending from said yoke portion of said attaching cap having the free end thereof screw threaded, a seat post including a stem slotted longitudinally thereof from the lower end and adapted for plunger action through the opening of the ring shaped portion of the attaching cap to have the yoke portion of said attaching cap slidably disposed in the slot thereof, a spring member, adjustable nut means supporting said spring member upon the lower end of said rod, and detachable pin means adapted for selective adjustment through the stem portion of said seat post and extending through the slot therein for engagement with the yoke portion of said attaching cap whereby the spring may be maintained under an initial compression for resiliently supporting said seat post.

12. In a device of the class described, the combination with a supporting frame and a seat, of an attaching member secured to said frame, a spring, means for supporting said spring from said attaching member, a seat post slidably carried by said attaching member and said frame to be normally urged in one direction by said spring, and means connected to said seat and to said frame to prevent lateral movement of said seat with respect to said frame and permitting vertical movement thereof.

CHARLES NOTH.